US012597272B2

(12) United States Patent
Garcia

(10) Patent No.: US 12,597,272 B2
(45) Date of Patent: Apr. 7, 2026

(54) METHOD FOR DETERMINING THE POSITION OF AN OBJECT WITH RESPECT TO A ROAD MARKING LINE OF A ROAD

(71) Applicant: Continental Autonomous Mobility Germany GmbH, Ingolstadt (DE)

(72) Inventor: Lucien Garcia, Tournefeuille (FR)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 19 days.

(21) Appl. No.: 18/692,962

(22) PCT Filed: Sep. 21, 2022

(86) PCT No.: PCT/EP2022/076267
§ 371 (c)(1),
(2) Date: Mar. 18, 2024

(87) PCT Pub. No.: WO2023/046776
PCT Pub. Date: Mar. 30, 2023

(65) Prior Publication Data
US 2024/0386728 A1 Nov. 21, 2024

(30) Foreign Application Priority Data
Sep. 21, 2021 (FR) .................................. FR2109899

(51) Int. Cl.
*G06V 20/56* (2022.01)
*G06T 7/246* (2017.01)
*G06T 7/73* (2017.01)
(52) U.S. Cl.
CPC ............ *G06V 20/588* (2022.01); *G06T 7/246* (2017.01); *G06T 7/73* (2017.01); *G06V 2201/07* (2022.01)

(58) Field of Classification Search
CPC .. G06V 20/588; G06V 2201/07; G06V 10/12; G06V 10/62; G06V 2201/08;
(Continued)

(56) References Cited

U.S. PATENT DOCUMENTS 11,161,456 B1 * 11/2021 Day ........................... B60R 1/26
11,427,196 B2 * 8/2022 Switkes ................. G08G 1/166
(Continued)

FOREIGN PATENT DOCUMENTS

WO 2013022159 A1 2/2013

OTHER PUBLICATIONS

Efenberger et al., "Automatic Recognition of Vehicles Approaching from Behind", Intelligent Vehicles '92 Symposium., Proceedings of the Detroit, MI, USA, Jun. 29-Jul. 1, 1992, New York, NY, USA, JEEE, US, Jun. 29, 1992, pp. 57-62, XP010066490.
(Continued)

*Primary Examiner* — Gims S Philippe
(74) *Attorney, Agent, or Firm* — Buchanan Ingersoll & Rooney P.C

(57) ABSTRACT

A method for determining the position of an object with respect to a road line marking of a road, by generating a sequence of images of the vehicle's rear environment; selecting at least one point on the road line marking in the lower part of at least the first image of the sequence and tracking the advance of the at least one point in the images of the image sequence; converting the coordinates of the at least one selected point tracked in the images into a plurality of sets of coordinates corresponding to a plurality of points expressed in a 3D reference frame attached to the vehicle; detecting and tracking, based on the images of the image sequence, at least one object located in the rear environment (Continued)

of the vehicle; determining the position of the detected and tracked object with respect to the at least one materialized line marking.

10 Claims, 4 Drawing Sheets

(58) Field of Classification Search
CPC .. G06T 7/246; G06T 7/73; G06T 7/70; G06T 2207/30256
See application file for complete search history.

(56) References Cited

U.S. PATENT DOCUMENTS

| | | | | |
|---|---|---|---|---|
| 2008/0015772 | A1* | 1/2008 | Sanma | B60K 35/22 |
| | | | | 701/408 |
| 2012/0221168 | A1* | 8/2012 | Zeng | B60W 60/0018 |
| | | | | 701/1 |
| 2013/0141520 | A1 | 6/2013 | Zhang et al. | |
| 2013/0293714 | A1 | 11/2013 | Zhang et al. | |
| 2014/0037142 | A1* | 2/2014 | Bhanu | G06V 10/98 |
| | | | | 382/103 |
| 2018/0131924 | A1 | 5/2018 | Jung et al. | |
| 2020/0094826 | A1* | 3/2020 | Abe | B60W 60/0053 |
| 2023/0005374 | A1* | 1/2023 | Elimaleh | G08G 1/065 |
| 2024/0190465 | A1* | 6/2024 | Kume | B60W 50/14 |

OTHER PUBLICATIONS

International Preliminary Report on Patentability issued on May 31, 2022 by République Française, INPI, France, in corresponding Application No. FR2109899. (8 pgs.).

International Search Report (PCT/ISA/210) with translation and Written Opinion (PCT/ISA/237) mailed on Dec. 16, 2022, by the European Patent Office as the International Searching Authority for International Application No. PCT/EP2022/076267. (16 pages).

Li et al., "Lane Detection (Part I): Mono-Vision Based Method", HAL Open science, Jan. 25, 2013. (30 pages).

* cited by examiner

METHOD FOR DETERMINING THE POSITION OF AN OBJECT WITH RESPECT TO A ROAD MARKING LINE OF A ROAD

CROSS REFERENCE TO RELATED APPLICATIONS

This application is the U.S. National Phase Application of PCT/EP2022/076267, filed Sep. 21, 2022, which claims priority to French Application No. 2109899, filed Sep. 21, 2021, the contents of such applications being incorporated by reference herein.

FIELD OF THE INVENTION

The present invention relates to the field of motor vehicles and more particularly to a method for locating an object with respect to a road line marking of a traffic lane.

BACKGROUND OF THE INVENTION

Nowadays, it is known to equip a motor vehicle with cameras for driver-assistance purposes. For example, a camera placed at the front of the vehicle may allow obstacles or road line markings to be detected, while a camera placed at the rear of the vehicle may allow the driver to be assisted with reversing.

Road line markings may in particular be detected to prevent the vehicle from deviating from the lane in which it is being driven, or indeed to monitor the level of attention of the driver while driving or even to guide a vehicle in an assisted or autonomous manner. In the latter case, it may be important or even necessary to identify the lane in which the other vehicles are being driven. In particular, it may be advantageous to identify the lane in which third-party vehicles located behind said vehicle are being driven, for example in order to allow the driver to retake control when an emergency vehicle is approaching from behind.

In one known solution, line markings are detected in images by identifying pixels that are the colors of the line marking. However, this solution does not allow road line markings to be detected beyond a distance of about one hundred meters, as line markings are difficult to see beyond this distance. Thus, it is not possible with this solution to identify the lane of a vehicle appearing far off in the images, for example at about 200 m in the field of view of the camera, since the road line markings are not visible at this distance.

There is therefore a need for a solution, to at least partially remedy these drawbacks.

SUMMARY OF THE INVENTION

One of the aims of the invention is to provide a reliable way of identifying the lane of other vehicles. Another aim of the invention is to provide a way of detecting emergency vehicles coming from behind the vehicle.

To this end, one subject of the invention is a method for determining the position of an object with respect to a road line marking of a road using a camera mounted at the rear of a motor vehicle, said vehicle comprising an electronic control unit, said method comprising steps of:

generating, by means of the camera, a sequence of images of the rear environment of the vehicle, said environment comprising at least one road line marking, selecting, by means of the electronic control unit, at least one point on the road line marking in the lower part of at least one image of the sequence, said point being characterized, in each image, by its coordinates in the reference frame of the image, tracking, by means of the electronic control unit, the advance of the at least one selected point in the images of the sequence of images, converting, by means of the electronic control unit, the coordinates of the at least one selected point tracked in the images into a plurality of sets of coordinates corresponding to a plurality of points expressed in a three-dimensional reference frame attached to the vehicle, so as to materialize the at least one road line marking in said three-dimensional reference system, detecting and tracking, by means of the electronic control unit, based on the images of the sequence of images, at least one object located in the rear environment of the vehicle, determining, by means of the electronic control unit, the position of the detected and tracked object with respect to the at least one materialized line marking.

Through use of a rear camera, an aspect of the invention in particular allows points to be tracked as they advance through the images, i.e. as they pass from the bottom of the images to the top as the images of the sequence progress. In contrast to prior-art solutions, which detect points on the road line markings in each image in order to materialize the latter, with the risk of error that this entails for the points furthest away (top of the image for a rear camera), tracking selected points close to the vehicle, i.e. at the bottom of the first image in the sequence, makes it possible to ensure from the very beginning that the conversion between the reference frame of the image and the three-dimensional frame is accurate. Specifically, selecting points close to the vehicle that are then tracked in the images makes it possible to ensure that the reference frame of the image and the three-dimensional reference frame attached to the vehicle are in the same plane of the road, this not necessarily being the case with imaged points far from the vehicle. Selecting nearby points to be tracked makes it possible to materialize the line markings accurately, correctly and reliably and in real time. This thus makes it possible to ensure that an object located at the rear of the vehicle is positioned with a high probability of certainty with respect to the road line markings. The detected object may in particular be an emergency vehicle approaching the vehicle from behind. In this case, an aspect of the invention makes it possible to determine the lane in which the emergency vehicle is being driven, so that it may act accordingly. Thus, if the vehicle implementing an aspect of the invention is in autonomous driving mode, the on-board computer may change lanes if necessary in order to let the emergency vehicle pass.

In one embodiment, the object of the environment being detected and tracked in the images of the sequence, the method comprises a step of converting, by means of the electronic control unit, at least one point on the object of the environment tracked in the images to at least one point expressed in the three-dimensional reference frame so as to materialize the object of the environment in said three-dimensional reference frame.

In another embodiment, the object of the environment is detected and tracked directly in the three-dimensional reference frame.

According to one aspect of the invention, the method further comprises a step of detecting the at least one line marking in the images, a step of projecting the at least one materialized line marking into the reference frame of the image and a step of determining the error between the detected line marking and the projected line marking.

An aspect of the invention also relates to a computer program product characterized in that it contains a set of program code instructions that, when they are executed by one or more processors, configure the one or more processors to implement a method as set out above.

An aspect of the invention also relates to an electronic control unit for a motor vehicle, said electronic control unit being configured to:

receive a sequence of images of the rear environment of the vehicle generated by a camera mounted at the rear of said vehicle, said environment comprising at least one road line marking, select at least one point on the road line marking in the lower part of at least one image of the sequence, said point being characterized in each image by its coordinates in the reference frame of the image, track the advance of the at least one point in the images of the sequence of images, convert the coordinates of the at least one selected point tracked in the images into a plurality of sets of coordinates corresponding to a plurality of points expressed in a three-dimensional reference frame attached to the vehicle, so as to materialize the at least one road line marking in said three-dimensional reference system, detect and track, based on the images of the sequence of images, at least one object located in the rear environment of the vehicle, determine the position of the detected and tracked object with respect to the at least one materialized line marking.

In one embodiment, the electronic control unit is configured to detect and track the object of the environment in the images of the sequence, and to convert at least one point on the object of the environment tracked in the images into at least one point expressed in the three-dimensional reference frame so as to materialize the object of the environment in said three-dimensional reference frame.

As a variant or in addition, the electronic control unit is configured to detect and track the object of the environment directly in the three-dimensional reference frame.

Advantageously, the electronic control unit is configured to detect the at least one line marking in the images, to project the at least one materialized line marking into the reference frame of the image and to determine the error between the detected line marking and the projected line marking.

An aspect of the invention also relates to a motor vehicle comprising a camera mounted at the rear of said vehicle and configured to generate a sequence of images of the rear environment of the vehicle, and an electronic control unit such as presented above.

BRIEF DESCRIPTION OF THE DRAWINGS

Further features and advantages of aspects of the invention will become more clearly apparent on reading the following description. This description is purely illustrative and should be read in conjunction with the appended drawings, in which.

DETAILED DESCRIPTION OF THE PREFERRED EMBODIMENTS

Figure 1:
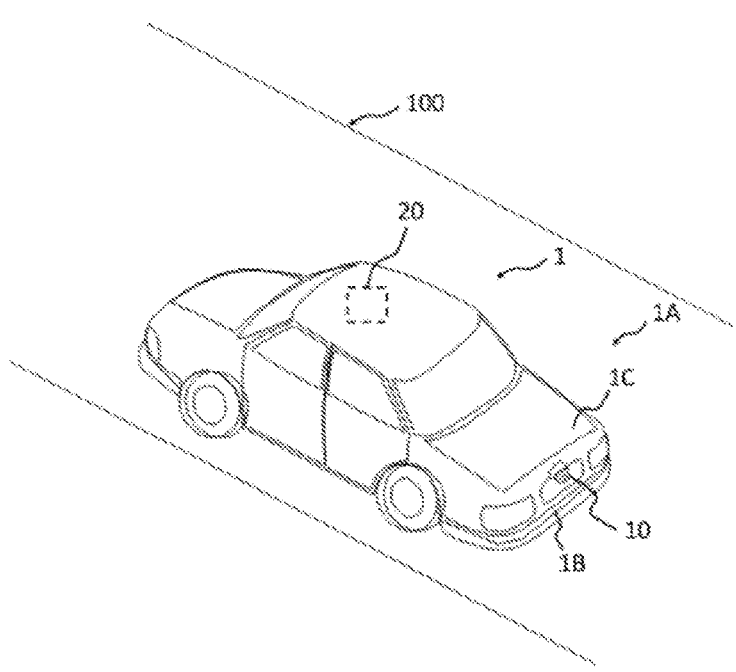
FIG. 1 schematically illustrates one embodiment of a vehicle according to the invention.
Figure 2:
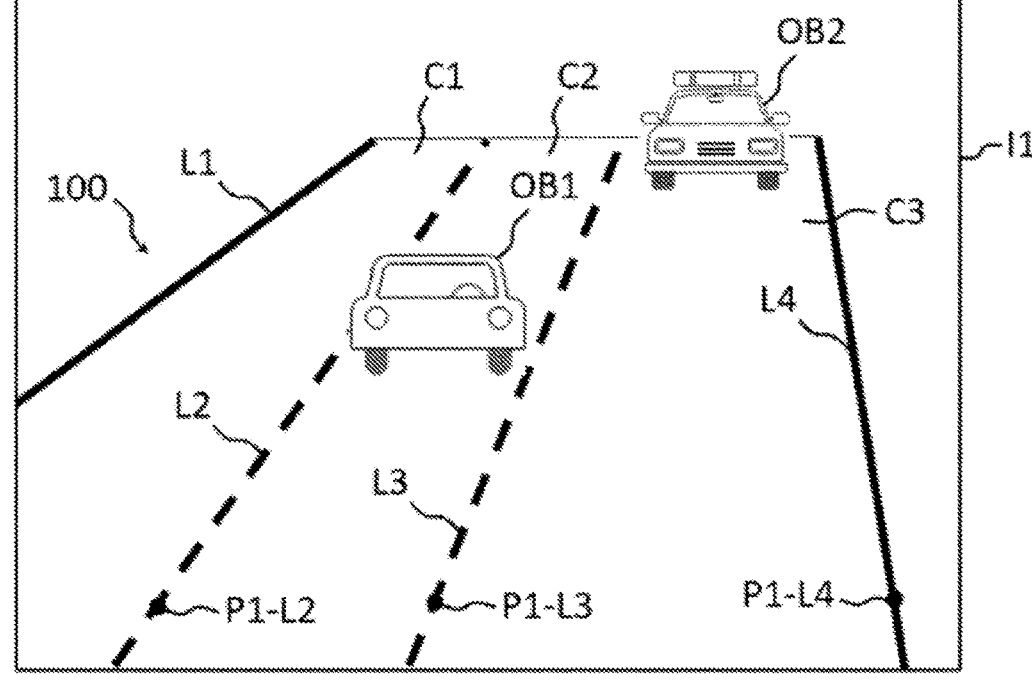
FIG. 2 schematically illustrates one example of a first image of a sequence of images.
Figures 3, 4:
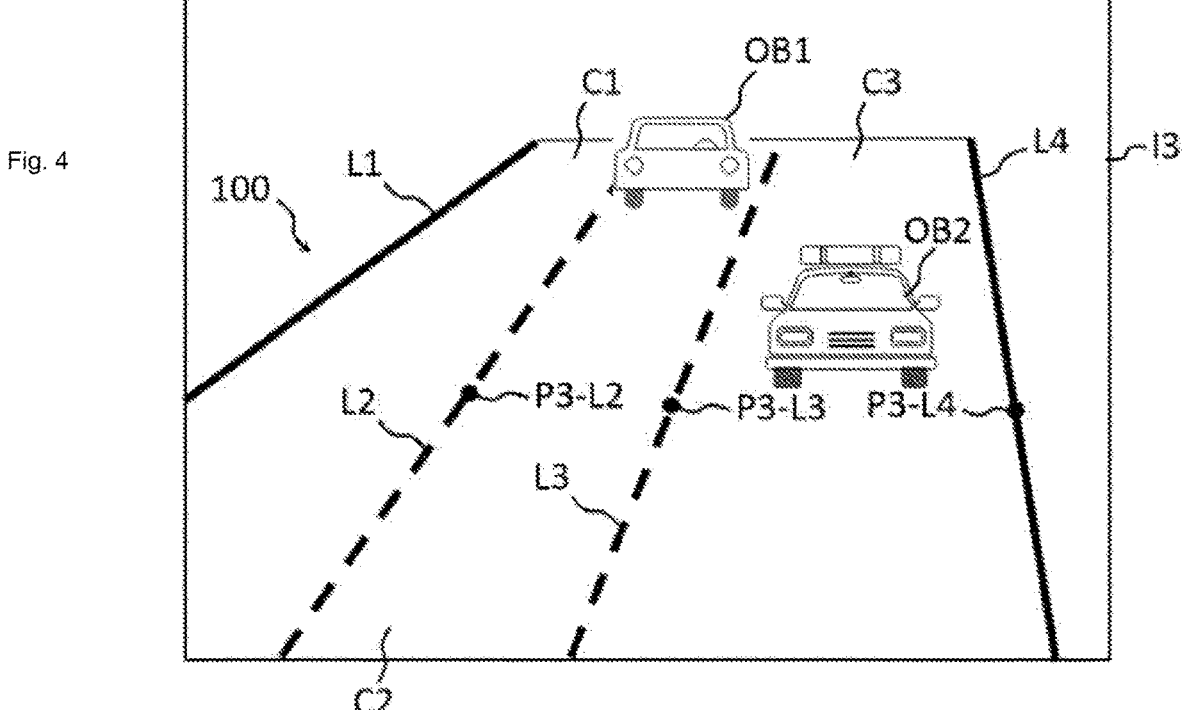
FIG. 3 schematically illustrates one example of a second image of a sequence of images.
FIG. 4 schematically illustrates one example of a third image of a sequence of images.
Figure 5:
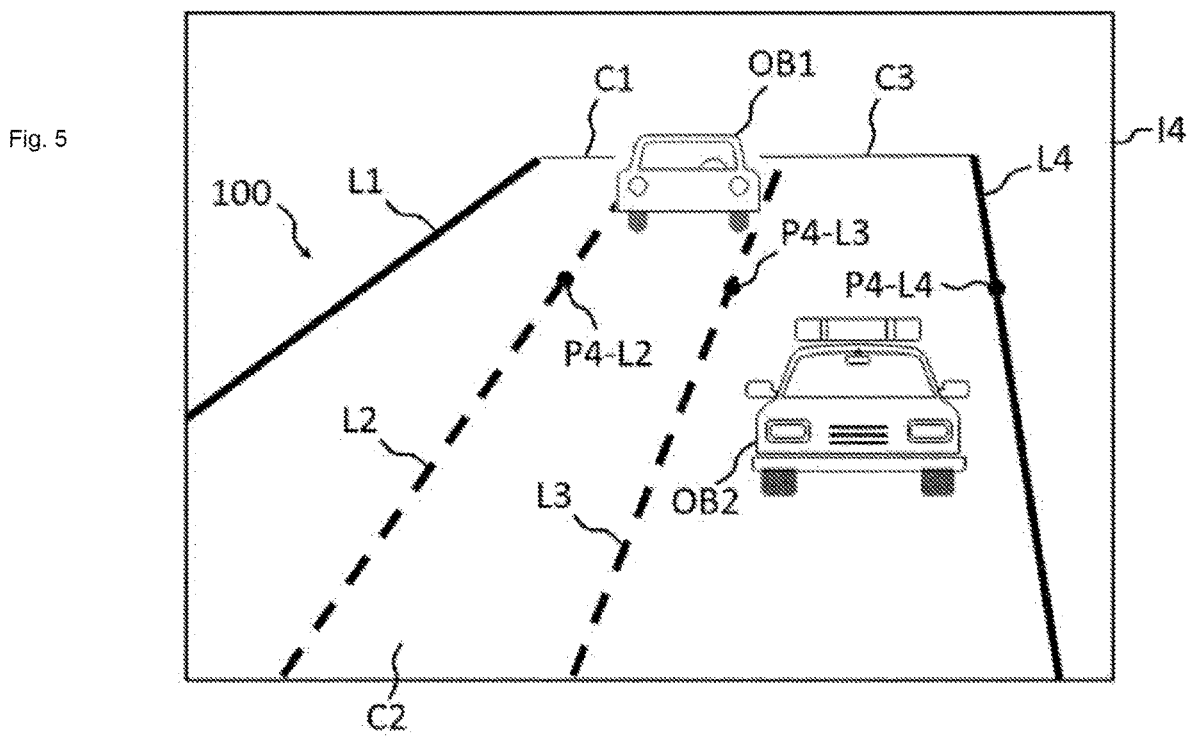
FIG. 5 schematically illustrates one example of a fourth image of a sequence of images.

FIG. 1 diagrammatically shows one example of a motor vehicle 1 according to an aspect of the invention. The vehicle 1 comprises a camera 10 and an electronic control unit 20.

The camera 10 is mounted on the rear part 1A of the vehicle 1, for example between the rear bumper 1B and the rear trunk 1C, and configured to generate a sequence of images of the rear environment of the vehicle 1, and in particular of the road 100. As a variant, the camera 10 could be mounted in any other suitable location on the vehicle 1, behind the rear windscreen for example.

The electronic control unit 20 is mounted in the vehicle 1 and is connected to the camera 10 via a bus or a data communication network (not shown) in a manner known per se. As a variant, the electronic control unit 20 could be mounted in the same housing as the camera 10.

The electronic control unit 20 is configured to receive a sequence of images of the rear environment of the vehicle 1, generated by the camera 10, via the bus or the data communication network.

The electronic control unit 20 is configured to select and track the advance of one or, preferably, more than one point on one or more road line markings in the images of the received sequence, each point being characterized in each image of the sequence by its coordinates in a reference frame attached to the image, which reference plane is two-dimensional and called the reference frame of the image. In particular, the electronic control unit 20 is configured to implement a detection algorithm stored in its memory area and to track the selected point from one image to the next. There is no direct correspondence between a point detected on a line marking in two images. In contrast, its position in the following image may be determined in a manner known per se, for example by means of a motion vector, and the deviation from the detected line marking may be estimated, also in a manner known per se.

The detection algorithm is configured to identify a region of the first image I1 as being a road line marking, for example a group of white pixels is identified as being a road line marking when the pavement is moreover gray between the road line markings L1, L2, L3, L4.

The electronic control unit 20 is configured to convert the coordinates of each point tracked in the images into a plurality of sets of coordinates corresponding to a plurality of points expressed in a three-dimensional reference frame attached to the vehicle. Thus, a given point on a road line marking allows, as it moves from one image to the next of the sequence, the road line marking to be materialized in said three-dimensional reference frame (also called the "3D reference frame") over time, i.e. over the duration of the sequence of images. The 3D reference frame of the vehicle 1 is preferably attached to the rear part of the vehicle 1. For example, the 3D reference frame of the vehicle 1 may have as origin the rear axle of the vehicle 1 or one of the rear wheels of the vehicle 1.

The electronic control unit 20 is configured to detect and track at least one object of the rear environment of the vehicle 1. This object may in particular be another vehicle such as, for example, an emergency vehicle (ambulance, fire truck, police interceptor, etc.) or a fixed element such as, for example, a bridge, a tower, a sign or any structure the position of which with respect to the one or more road line markings has a bearing on driving the vehicle 1.

The electronic control unit 20 is configured to determine the position of the object of the environment with respect to the one or more materialized line markings.

In one embodiment, the electronic control unit 20 is configured to detect and track the object in the images of the sequence, and to convert at least one point on the object tracked in the images into at least one point expressed in the three-dimensional reference frame so as to materialize the object of the environment in said three-dimensional reference frame.

In another embodiment, the electronic control unit 20 is configured to detect and track the object of the environment directly in the three-dimensional reference frame. For example, the information that the detected object is on the ground may be used. More precisely, considering the ground to be flat, it is possible to convert a 2D point located on the ground into a 3D point with a longitudinal distance, a lateral distance and a zero elevation. It is also possible to estimate the dimensions of the object, to deduce its distance given its size in the image.

The electronic control unit 20 is configured to detect the one or more road line markings in the images, to project the one or more materialized line markings from the three-dimensional reference frame to the reference frame of the image and to determine the error between the detected line marking and the projected line marking.

The electronic control unit 20 comprises a processor able to implement an instruction set allowing these functions to be performed, and a memory area allowing said instruction set to be stored.

Implementation

One example of implementation will now be described with reference to FIGS. 2 to 7.

FIGS. 2 to 5 each show one image I1, I2, I3, I4 of the sequence of images I1, I2, I3, I4 in chronological order. In the example described below with reference to FIGS. 2 to 5, the vehicle 1 is being driven on a road 100 comprising four road line markings L1, L2, L3, L4 defining three traffic lanes in the direction of vehicle travel: a lane referred to as the "right" lane C1, a lane referred to as the "central" lane C2 and a lane referred to as the "left" lane C3. The direction of travel and overtaking are those of so-called right-hand traffic, i.e. those of most countries (France, Germany, United States, etc.). Thus, vehicles are normally driven in the right-hand lane C1 or the central lane C2 and normally overtake using the central lane C2 or the left-hand lane C3 as the case may be.

In the example of FIGS. 2 to 5, the vehicle 1 is an autonomous vehicle being driven in the left-hand lane C3. A first object OB1 is a third-party vehicle being driven in the central lane C2. A second object OB2 is an ambulance approaching from behind the vehicle 1 in the left-hand lane C3.

In a step E1, the camera 10 generates a sequence of images I1, I2, I3, I4 of the rear environment of the vehicle 1, and in particular of the road line markings L1, L2, L3, L4 featuring in the images I1, I2, I3, I4. These images are sent one by one periodically and in real time to the electronic control unit 20 via the data communication network of the vehicle 1.

Next, in a step E2, the electronic control unit 20 first selects, in the first image I1, a first point P1-L2, P1-L3, P1-L4 on some or all of the road line markings depending on the desired accuracy and completeness. In this example, a first point P1-L2, P1-L3, P1-L4 is selected and determined on each of the three road line markings L2, L3, L4 located furthest to the right in the image I1, the line marking L1 having less bearing on the objects OB1, OB2 the traffic lane of which it is desired to determine. By "selection of a point on each of the three road line markings L2, L3, L4", what is meant is selection of a group of pixels of the image I1 representing the road line marking L2, L3, L4.

The first point P1-L2, P1-L3, P1-L4 of each road line marking L2, L3, L4 is selected at the bottom of the first image I1, the bottom of the first image I1 representing the area of the road 100 closest the vehicle 1 and thus being able to be considered to be in the same plane as the vehicle 1 (planar area).

In order to select a point on a road line marking L1, L2, L3, L4, the electronic control unit 20 is configured to implement a detection algorithm that is stored in its memory area and that is configured to identify an area of the image I1 as being a road line marking, a group of white pixels for example being identified as being a road line marking when the pavement is moreover gray between the road line markings L1, L2, L3, L4.

Next, again in the context of step E2, the electronic control unit 20 tracks the points detected in the first image I1 in the following images I2, I3, I4 of the sequence, and preferably in each image I2, I3, I4. Thus, the electronic control unit 20 determines, in the second image I2, the three points P2-L2, P2-L3, P2-L4 corresponding to the three points P1-L2, P1-L3, P1-L4 originally detected in the first image I1 and that correspond to the same physical points on the road 100. The electronic control unit 20 then determines, in the third image I3, the three points P3-L2, P3-L3, P3-L4 corresponding to the three points P2-L2, P2-L3, P2-L4 determined in the second image I2 and that correspond to the same physical points on the road 100. The electronic control unit 20 determines, in the fourth image I4, the three points P4-L2, P4-L3, P4-L4 corresponding to the three points P3-L2, P3-L3, P3-L4 determined in the third image I3 and that correspond to the same physical points on the road 100.

A point P1-L2, P1-L3, P1-L4, P2-L2, P2-L3, P2-L4, P3-L2, P3-L3, P3-L4, P4-L2, P4-L3, P4-L4 tracked between two consecutive images I1, I2, I3, I4 of the sequence and representing the same physical point on the road 100 is determined in an image in a known manner, for example using a motion vector. Since this method is known, it will not be described in any further detail here.

Each point P1-L2, P1-L3, P1-L4, P2-L2, P2-L3, P2-L4, P3-L2, P3-L3, P3-L4, P4-L2, P4-L3, P4-L4 is characterized in the image I1, I2, I3, I4 in which it appears by its coordinates in the reference frame of said image I1, I2, I3, I4.

Figure 6:
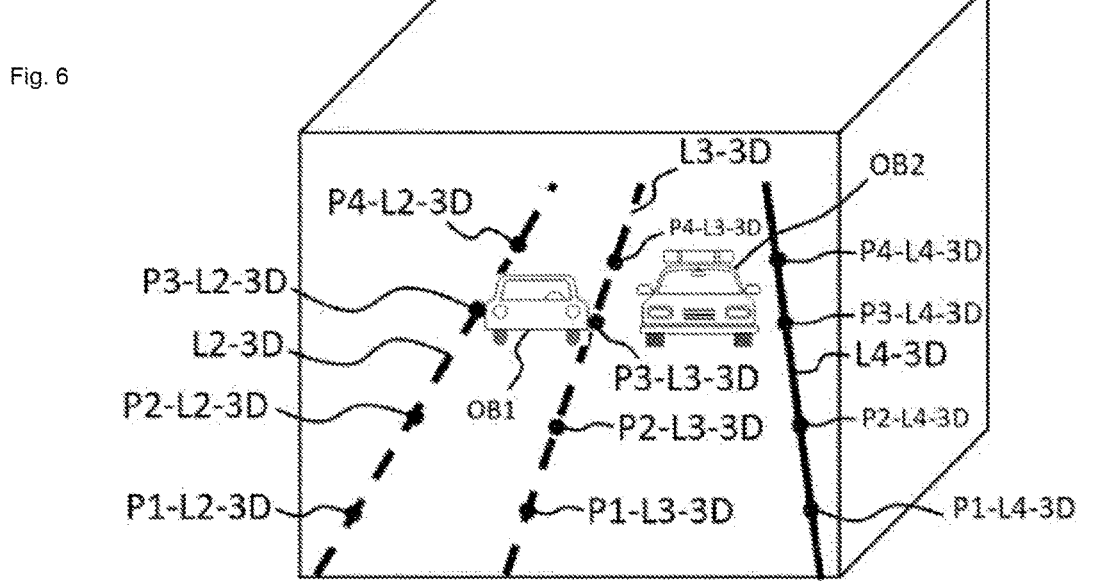
FIG. 6 schematically illustrates one example of a 3D map of a road.
Figure 7:
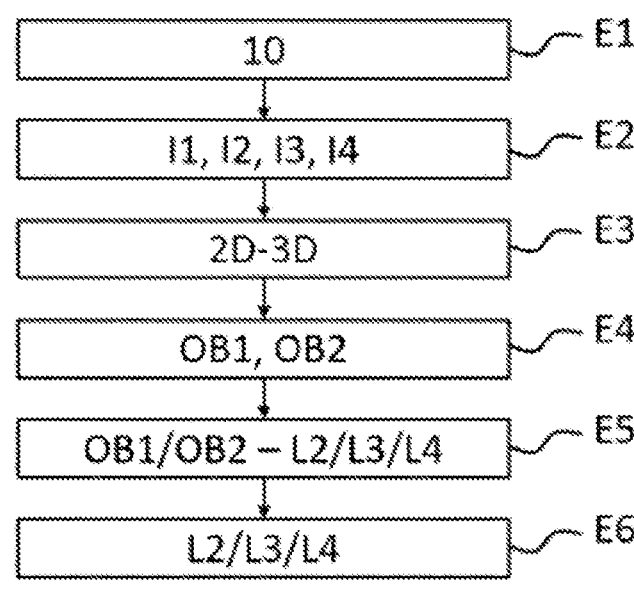
FIG. 7 schematically illustrates an embodiment of a method according to the invention.

In a step E3, the electronic control unit 20 converts the coordinates of the points detected and tracked in the images into a plurality of sets of coordinates corresponding to a plurality of points P1-L2-3D, P1-L3-3D, P1-L4-3D, P2-L2-3D, P2-L3-3D, P2-L4-3D, P3-L2-3D, P3-L3-3D, P3-L4-3D, P4-L2-3D, P4-L3-3D, P4-L4-3D expressed in the 3D reference frame attached to the vehicle 1 so as to materialize the road line markings L2, L3, L4 in said 3D reference frame, then denoted L2-3D, L3-3D, L4-3D, as illustrated in FIG. 6.

This 2D-3D conversion, which uses a matrix-based translational and rotational conversion as explained below, is made possible by the fact that the planar-surface assumption is made for points on the road 100 close to the vehicle 1. In other words, the assumption that two points are located on the same planar surface as the vehicle 1 may be made in order to ensure that the conversion of the coordinates of the detected points between the (2D) reference frame of the image and the (3D) reference frame attached to the vehicle 1, as detailed in step E3, is mathematically accurate by reducing error since the points are defined with respect to the same plane of the road 100, which plane is located level with the rear of the vehicle 1, at least for the first image I1.

The conversion of a 2D point into a 3D point is carried out in a known manner using the position of the camera 10 in the vehicle 1 with respect to a reference point associated with the vehicle 1 (for example on the ground beneath the middle of the rear axle), this position being characterized by a first rotation matrix and a second translation matrix. In order to then convert a 3D point between two given times (two images), it is necessary to know the movement of the reference frame attached to the vehicle 1, this movement being characterized between these two times by a second rotation matrix and a second translation matrix.

The conversion of step E3 may be carried out each time a point is selected or determined during tracking thereof, i.e. for each image received by the electronic control unit 20.

In a step E4, the electronic control unit 20 detects and tracks, in parallel with steps E1, E2 and E3, the first object OB1 and the second object OB2 in each image I1, I2, I3, I4.

For example, the electronic control unit 20 converts all or some of the pixels corresponding to the objects OB1 and OB2 in the images I1, I2, I3, I4 into points expressed in the 3D reference frame, so as to materialize them in said 3D reference frame in order to position them relative to the road line markings L2, L3, L4. As a variant, the objects OB1, OB2 could be detected and tracked directly in the 3D reference frame, for example as described above.

The electronic control unit 20 determines, in a step E5, consecutive to step E4 and in parallel with steps E1, E2 and E3, for example each time an image I1, I2, I3, I4 is received, the position of the objects OB1 and OB2 with respect to the three line markings L2, L3, L4 materialized during steps E1, E2 and E3 in order to determine in which lane the first object OB1 is moving and in which lane the second object OB2 is moving.

Advantageously, in an optional step E6, the road line markings L2, L3, L4 may be detected in the images I1, I2, I3, I4 by means of the electronic control unit 20, for example using the detection algorithm mentioned above, and then the electronic control unit 20 projects the road line markings L2, L3, L4 materialized in the 3D reference frame into the 2D reference frame of the image and then determines the error between each detected line marking and each corresponding projected line marking in order to determine an index of confidence in the position of the objects with respect to the road line markings L2, L3, L4.

In the example described above, only the points detected in the first image I1 are tracked in the following images I2, I3, I4. However, other first points could be selected in the images I2, I3, I4 following the first image I1 in order to reiterate the method on these points, in parallel with the method on the points selected in the first image I1, and thus better determine the position of the objects with respect to the road line markings L2, L3, L4.

The invention claimed is:

1. A method for determining the position of an object with respect to a road line marking of a road using a camera mounted at the rear of a motor vehicle, said vehicle comprising an electronic control unit, said method comprising:
   generating by the camera a sequence of images of the rear environment of the vehicle, said environment comprising at least one road line marking,
   selecting, by the electronic control unit, at least one point on the road line marking in the lower part of at least the first image of the sequence, said point being characterized, in each image, by its coordinates in the reference frame of the image, and tracking, by the electronic control unit, the advance of the at least one point in the images of the sequence of images,
   converting, by the electronic control unit, the coordinates of the at least one selected point tracked in the images into a plurality of sets of coordinates corresponding to a plurality of points expressed in a three-dimensional reference frame attached to the vehicle, so as to materialize the at least one road line marking in said three-dimensional reference system,
   detecting and tracking, by the electronic control unit, based on the images of the sequence of images, at least one object located in the rear environment of the vehicle, and
   determining, by the electronic control unit, the position of the detected and tracked object with respect to the at least one materialized line marking.

2. The method as claimed in claim 1, wherein, the object of the environment being detected and tracked in the images of the sequence, the method further comprises converting, by the electronic control unit, at least one point on the object of the environment tracked in the images to at least one point expressed in the three-dimensional reference frame so as to materialize the object of the environment in said three-dimensional reference frame.

3. The method as claimed in claim 1, wherein the object of the environment is detected and tracked directly in the three-dimensional reference frame.

4. The method as claimed in claim 1, further comprising detecting the at least one line marking in the images, a step of projecting the at least one materialized line marking into the reference frame of the image and a step of determining the error between the detected line marking and the projected line marking.

5. A non-transitory computer program product, comprising a set of program code instructions that, when executed by one or more processors, configure the one or more processors to implement a method as claimed in claim 1.

6. An electronic control unit for a motor vehicle, said electronic control unit being configured to:
   receive a sequence of images of the rear environment of the vehicle generated by a camera mounted at the rear of said vehicle, said environment comprising at least one road line marking,
   select at least one point on the road line marking in the lower part of at least one image of the sequence, said point being characterized in each image by its coordinates in the reference frame of the image,
   track the progress of the at least one point in the images of the sequence of images,
   convert the coordinates of the at least one selected point tracked in the images into a plurality of sets of coordinates corresponding to a plurality of points expressed in a three-dimensional reference frame attached to the vehicle, so as to materialize the at least one road line marking in said three-dimensional reference system, detect and track, based on the images of the sequence of images, at least one object located in the rear environment of the vehicle, and determine the position of the detected and tracked object with respect to the at least one materialized line marking.

7. The electronic control unit as claimed in claim 6, configured to detect and track the object of the environment in the images of the sequence, and to convert at least one point on the object of the environment tracked in the images into at least one point expressed in the three-dimensional reference frame so as to materialize the object of the environment in said three-dimensional reference frame.

8. The electronic control unit as claimed in claim 6, configured to detect and track the object of the environment directly in the three-dimensional reference frame.

9. The electronic control unit as claimed in claim 6, configured to detect the at least one line marking in the images, to project the at least one materialized line marking into the reference frame of the image and to determine the error between the detected line marking and the projected line marking.

10. A motor vehicle comprising a camera mounted at a rear of said vehicle and configured to generate a sequence of images of a rear environment of the vehicle, and an electronic control unit as claimed in claim 6.

\*   \*   \*   \*   \*